United States Patent
Gu et al.

(10) Patent No.: US 11,163,860 B2
(45) Date of Patent: Nov. 2, 2021

(54) PROTECTING DEEP LEARNING MODELS USING WATERMARKING

(71) Applicant: International Business Machines Corporation, Armonk, NY (US)

(72) Inventors: Zhongshu Gu, Ridgewood, NJ (US); Heqing Huang, Mahwah, NJ (US); Marc Phillipe Stoecklin, White Plains, NY (US); Jialong Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 15/997,159

(22) Filed: Jun. 4, 2018

(65) Prior Publication Data
US 2019/0370440 A1 Dec. 5, 2019

(51) Int. Cl.
*H04L 29/06* (2006.01)
*G06F 21/16* (2013.01)
*G06N 3/08* (2006.01)

(52) U.S. Cl.
CPC .............. *G06F 21/16* (2013.01); *G06N 3/08* (2013.01)

(58) Field of Classification Search
CPC .... H04N 2201/327; G06F 21/16; G06F 21/64
See application file for complete search history.

(56) References Cited

U.S. PATENT DOCUMENTS

| 2006/0013435 | A1 | 1/2006 | Rhoads | |
|---|---|---|---|---|
| 2007/0047442 | A1* | 3/2007 | Snyder | H04L 63/1408 370/235 |
| 2015/0055855 | A1* | 2/2015 | Rodriguez | G06K 9/6259 382/159 |

FOREIGN PATENT DOCUMENTS

CN 107704806 2/2018

OTHER PUBLICATIONS

Uchida et al, "Embedding watermarks into deep neural networks," Proceedings International Conference on Multimedia Retrieval, 2017.

* cited by examiner

*Primary Examiner* — Jason K Gee
(74) *Attorney, Agent, or Firm* — Jeffrey S. LaBaw; David H. Judson

(57) ABSTRACT

A framework to accurately and quickly verify the ownership of remotely-deployed deep learning models is provided without affecting model accuracy for normal input data. The approach involves generating a watermark, embedding the watermark in a local deep neural network (DNN) model by learning, namely, by training the local DNN model to learn the watermark and a predefined label associated therewith, and later performing a black-box verification against a remote service that is suspected of executing the DNN model without permission. The predefined label is distinct from a true label for a data item in training data for the model that does not include the watermark. Black-box verification includes simply issuing a query that includes a data item with the watermark, and then determining whether the query returns the predefined label.

21 Claims, 4 Drawing Sheets

```
ALGORITHM 1 WATERMARK EMBEDDING
INPUT:
    TRAINING SET D_train = {Xi, Yi}^S_{i=1}
    DNN KEY K={Y_s, Y_d}(s ≠ d)
OUTPUT:
    DNN MODEL: F_θ
    WATERMARK PAIR: D_wm
1: function WATERMARK_EMBEDDING()
2:     D_wm ← 0
3:     D_tmp ← sample(Dtrain, Y_s, percentage)
4:     for each d ∈ D_tmp do
5:         x_wm = ADD_WATERMARK(d[x], watermarks)
6:         y_wm = yd
7:         D_wm = D_wm ∪ {x_wm, y_wm}
8:     end for
9: end function
10: F_θ = Train(D_wm, D_train)
11: return F_θ, D_wm
```

ALGORITHM 1 WATERMARK EMBEDDING

INPUT:

TRAINING SET $D_{train} = \{X_i, Y_i\}_{i=1}^{S}$

DNN KEY $K=\{Y_s, Y_d\}(s \neq d)$

OUTPUT:

DNN MODEL: $F_\theta$

WATERMARK PAIR: $D_{wm}$

1: function WATERMARK_EMBEDDING()
2:     $D_{wm} \leftarrow 0$
3:     $D_{tmp} \leftarrow sample(D_{train}, Y_s, percentage)$
4:     for each $d \in D_{tmp}$ do
5:         $x_{wm} = ADD\_WATERMARK(d[x], watermarks)$
6:         $y_{wm} = y_d$
7:         $D_{wm} = D_{wm} \cup \{x_{wm}, y_{wm}\}$
8:     end for
9: end function
10: $F_\theta = Train(D_{wm}, D_{train})$
11: return $F_\theta, D_{wm}$

FIG. 6

PROTECTING DEEP LEARNING MODELS USING WATERMARKING

BACKGROUND

Technical Field

This disclosure relates generally to information security and, in particular, to protecting deep learning technologies against wrongful reproduction, distribution and use.

Background of the Related Art

Deep learning technologies, which are key components of state-of-the-art Artificial Intelligence (AI) services, have shown great success in providing human-level capabilities for a variety of tasks, such as image recognition, speech recognition, and natural language processing, and others. Most major technology companies are building their AI products and services with deep neural networks (DNNs) as the key components. Building a production-level deep learning model is a non-trivial task, which requires a large amount of training data, powerful computing resources, and human expertise. For example, Google's Inception v4 model is a cutting edge Convolutional Neural Network designed for image classification; creation of a model from this network takes from several days to several weeks on multiple GPUs with an image dataset having millions of images. In addition, designing a deep learning model requires significant machine learning expertise and numerous trial-and-error iterations for defining model architectures and selecting model hyper-parameters.

As deep learning models are more widely-deployed and become more valuable, they are increasingly targeted by adversaries, who can steal the models (e.g., via malware or insider attacks) and then seek to benefit from their wrongful use. In particular, once a model is stolen, it is easy for the attacker to setup a plagiarizing service with the stolen model. Such actions (theft, copyright infringement, misappropriation, etc.) jeopardize the intellectual property of the model owners, undermines the significant cost and efforts undertaken to develop the models, and may cause other serious economic consequences. While legal remedies often one possible approach to this problem, they are very costly and often produce unsatisfactory results.

The problem of protecting DNNs is not limited to addressing theft. Recently, DNN model sharing platforms have been launched to promote reproducible research results, and it is anticipated that commercial DNN model markets will arise to enable monetization of AI products and services. Indeed, individuals and companies desire to purchase and sell such models in the same way as in the current mobile application market. These opportunities create additional incentives for unauthorized entities to obtain and implement DNN models.

Given the anticipated widespread adoption and use of DNNs, there is a significant need to find a way to verify the ownership of a DNN model to protect the intellectual property therein and to otherwise detect the leakage of deep learning models.

Digital watermarking has been widely adopted to protect the copyright of proprietary multimedia content. Watermarking typically involves two stages: embedding and detection. In an embedding stage, owners embed watermarks into the protected multimedia. If the multimedia data are stolen and used by others, in the detection stage owners can extract the watermarks from the protected multimedia as legal evidence to prove their ownership of the intellectual property.

Recently, it has been proposed to embed watermarks in deep neural networks for DNN model protection. In this approach, watermarks are embedded into the parameters of DNN models during the training process. As a consequence, this approach to protecting a DNN model has significant constraints, notably the requirement that the watermark can only be extracted by having access to all the model parameters. This white-box approach is not viable in practice, because a stolen model would be expected to be deployed only as a service, thus preventing access to the model parameters necessary to extract the watermark.

There remains a significant need to find new and more effective ways to protect the intellectual property of deep learning models.

BRIEF SUMMARY

The subject matter herein provides a technique to protect the intellectual property of deep learning models. According to this disclosure, a general watermarking framework is provided to produce watermarks, to embed them into deep neural networks (DNNs) as these networks are trained, and to enable remote verification of the ownership of DNN models based on the embedded watermarks. The watermarks (sometimes referred to herein as secret triggers) may be of different types, e.g., meaningful content embedded in the original training data, independent training data from unrelated classes, and pre-specified and meaningless noise. The watermarking framework enables a model owner or other authorized entity to remotely verify the ownership or provenance of a deep neural network without having access to the model's internal structure or parameters. This black box-based verification is carried out efficiently and reliably, typically with just one or more queries directed to an application programming interface (API) associated with a service from which the DNN is accessed.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 6 depicts a preferred technique for embedding a watermark in a DNN model according to this disclosure.

DETAILED DESCRIPTION OF AN ILLUSTRATIVE EMBODIMENT

Figure 1:
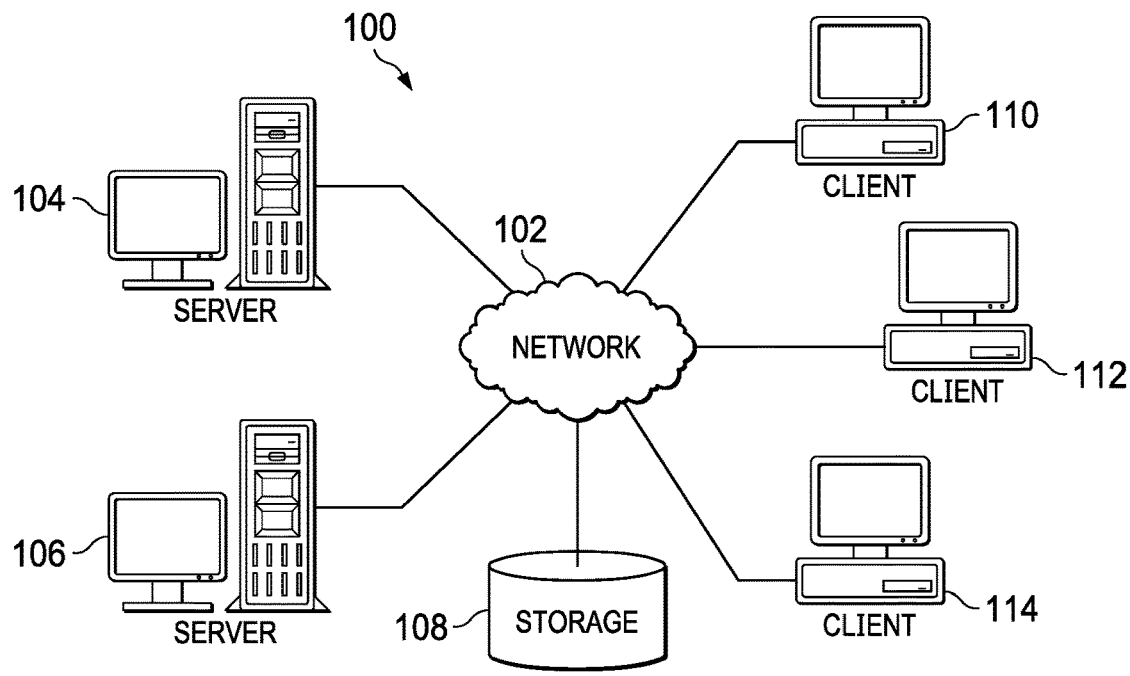
FIG. 1 depicts an exemplary block diagram of a distributed data processing environment in which exemplary aspects of the illustrative embodiments may be implemented.
Figure 2:
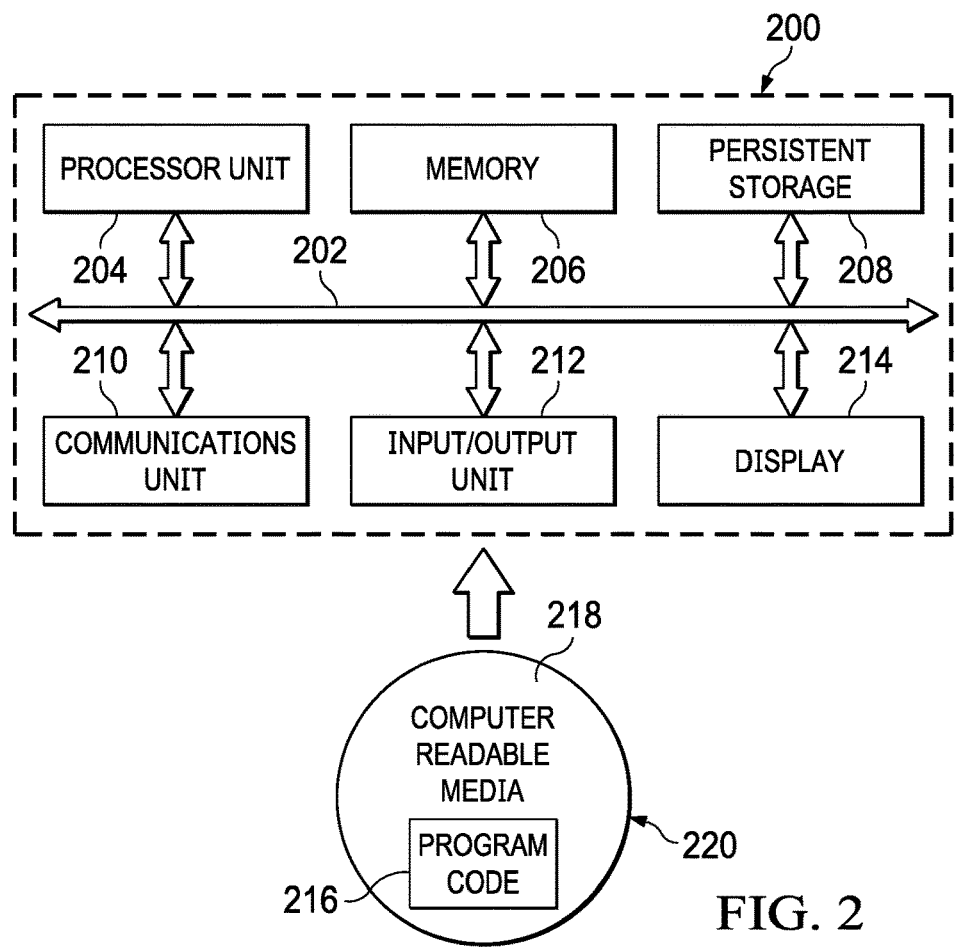
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Deep Neural Network

By way of additional background, deep learning is a type of machine learning framework that automatically learns hierarchical data representation from training data without the need to handcraft feature representation. Deep learning methods are based on learning architectures called deep neural networks (DNNs), which are composed of many basic neural network units such as linear perceptrons, convolutions and non-linear activation functions. Theses network units are organized as layers (from a few to more than a thousand), and they are trained directly from the raw data to recognize complicated concepts. Lower network layers often correspond with low-level features (e.g., in image recognition, such as corners and edges of images), while the higher layers correspond to high-level, semantically-meaningful features.

Specifically, a deep neural network (DNN) takes as input the raw training data representation and maps it to an output via a parametric function. The parametric function is defined by both the network architecture and the collective parameters of all the neural network units used in the network architecture. Each network unit receives an input vector from its connected neurons and outputs a value that will be passed to the following layers. For example, a linear unit outputs the dot product between its weight parameters and the output values of its connected neurons from the previous layers. To increase the capacity of DNNs in modeling the complex structure in training data, different types of network units have been developed and used in combination of linear activations, such as non-linear activation units (hyperbolic tangent, sigmoid, Rectified Linear Unit, etc.), max pooling and batch normalization. If the purpose of the neural network is to classify data into a finite set of classes, the activation function in the output layer typically is a softmax function, which can be viewed as the predicted class distribution of a set of classes.

Prior to training the network weights for a DNN, an initial step is to determine the architecture for the model, and this often requires non-trivial domain expertise and engineering efforts. Given the network architecture, the network behavior is determined by values of the network parameters, $\theta$. More formally, let $D=\{x_i, z_i\}_{i=1}^{T}$ be the training data, where $z_i \in [0, n-1]$ is a ground truth label for $x_i$, the network parameters are optimized to minimize a difference between the predicted class labels and the ground truth labels based on a loss function. Currently, the most widely-used approach for training DNNs is a back-propagation algorithm, where the network parameters are updated by propagating a gradient of prediction loss from the output layer through the entire network. Most commonly-used DNNs are feed-forward neural networks, wherein connections between the neurons do not form loops; other types of DNNs include recurrent neural networks, such as long short-term memory (LSTM), and these types of networks are effective in modeling sequential data.

Digital Watermarking

By way of additional background, digital watermarking is a technique that embeds certain watermarks in carrier multimedia data such as images, video or audio, to facilitate proof of copyright and thus to protect their copyright. The embedded watermarks can be detected when the watermarked multimedia data are scanned. Preferably, the watermark can only be detected and read to check authorship by the owner of the multimedia data who knows an encryption algorithm used to embed the watermarks.

Watermarking procedure is usually divided into two (2) steps: embedding and verification. In a typical embedding process, an embedding algorithm E embeds predefined watermarks W into the carrier data C, which is the data to be protected. After the embedding, the embedded data (e=E(W, C)) are stored or transmitted. During a watermark verification process, a decryption algorithm D attempts to extract the watermarks W' from e'. Here, the input data e' may be slightly different from previously embedded data e because e could be modified during the transmission or distribution. Such modification could be reproduced or derived from original data e. Therefore, after extracting watermark W', the extracted watermark is further verified with the original watermark W. If a relevant distance measure is acceptable, the carrier data is confirmed as the data originally protected by the watermark. Otherwise, the carrier data is deemed not to belong to the provider.

Threat Model

Figure 3:
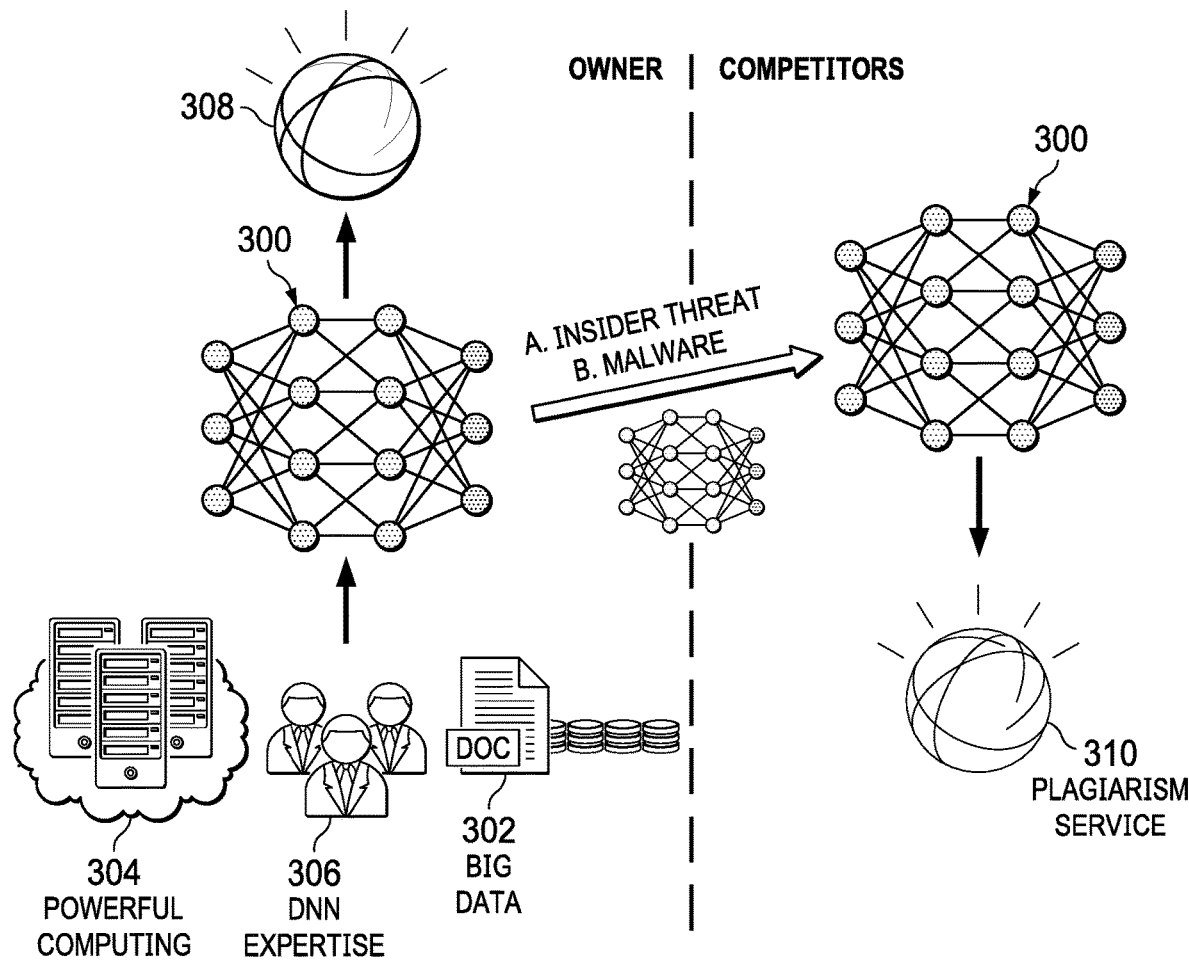
FIG. 3 illustrates how a local DNN model created by an owner may be stolen by a competitor to set up a plagiarized service.

Referring now to FIG. 3, the problem of deep neural network plagiarism that is addressed by the subject matter of this disclosure is depicted. On the left, an owner (or creator, developer, authorized provider, or the like) creates a production-level deep neural network 300 using a large amount of training data 302, powerful computing resources 304, and DNN human expertise 306. The owner makes that DNN available as a service 308. On the right, a competitor sets up a plagiarism service 310 by obtaining wrongful access to and possession of the DNN 300, perhaps via an insider who leaks the model, malware, fraud, or other improper means. More formally, a threat model for this scenario models two parties, a model owner O, who owns a deep neural network model m for a certain task, and a suspect S, who sets up a service t' from model m', while two services have similar performance t≅t'. The goal of the technique of this disclosure is to help owner O protect the intellectual property t of model m. Intuitively, if model m is equivalent to m', S can be confirmed as a plagiarized service of t. As will be described, the approach herein does not require white-box access to m', which as noted is not practical in any event because S is not anticipated to publicize relevant details of its m'. In the context of this disclosure, an entity is deemed to have white-box access to a model if it has access to the internals of the model, such as the model parameters; in contrast, the notion of a black-box implies that an entity does not have any such access but, rather, it can only analyze an input to the model and the corresponding output produced from that input. In addition, this threat model assumes that the S can modify the model m' but still maintain the performance of t' such that t'≅t. A useful verification approach also needs to robust to any such modifications.

As described below, the subject matter herein provides a method and framework to help owner O verify whether the service t' comes from (i.e., utilizes) the model m, without requiring white-box access to m'.

The nomenclature used in the above-described threat model (or in this disclosure generally) is not intended to be limiting. A model owner may be any person or entity having a proprietary interest in the model, e.g., but without limitation, its creator, designer or developer. As used herein, ownership is not necessarily tantamount to a legal right, although this will be the usual scenario. Ownership may also equate to provenance, source of origin, a beneficial or equitable interest, or the like. More generally, the threat model involves first and second entities, wherein as between the two entities the first entity has the greater (legal, equitable or other permissible) interest in the model, and it is desired to determine whether the second entity has obtained access to the model in contravention of the first entity's greater interest. In a typical scenario, the second entity has copied the model without the first entity's consent.

The nature of the training data used to train the DNN of course depends on the model's purpose. As noted above, deep neural networks have been proven useful for a variety of tasks, such as image recognition, speech recognition, natural language processing, and others. For ease of explanation, the remainder of this disclosure describes a DNN used to facilitate image recognition. Thus, the training data is described as being a set of images, and typically the DNN model is a feed-forward network. Other deep learning tasks, training data sets, DNN modeling approaches, etc. can leverage the technique as well.

Protecting DNN Models Using Watermarking

With the above as background, the technique of this disclosure is now described. The approach herein provides a general watermarking framework configured to produce different watermarks, to embed them into deep neural networks by learning, and to remotely verify the ownership of DNN models based on the embedded watermarks. As noted above, a significant advantage of this watermarking framework is that it can remotely verify the ownership of deep neural network services, typically with just a few API queries.

Figure 4:
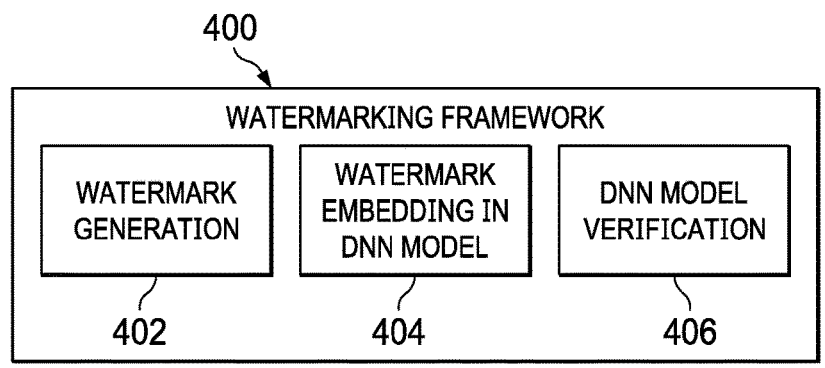
FIG. 4 depicts a watermarking framework according to this disclosure that is configured to detect unauthorized execution of a local DNN model by a remote service in a black-box manner.

As depicted in FIG. 4, the framework 400 typically has three (3) basic operations or components: watermark generation 402, DNN watermark embedding 404, and DNN model verification 406. These operations typically are implemented as a set of computer program instructions executing in one or more processors. Although the components are depicted as distinct, this is not a limitation, and components may be operations provided by other security products or services. The first two operations, watermark generation and DNN watermark embedding, typically occur in association with building the model, whereas the DNN model verification typically occurs after the model is deployed (and presumably stolen). Advantageously, model verification is the notion of verifying the ownership or provenance of a DNN hosted remotely (e.g., at service t') through extracting watermarks from that service and evaluating those watermarks, as will be described below. In this manner, the framework protects the DNN intellectual property against wrongful copying, distribution, use or other exploitation and, in particular, by enabling an owner or other permitted entity the ability to identify such wrongful activity. Once the activity is identified or characterized as such, an owner can then take appropriate remedial action (e.g., seeking legal remedies).

In operation, the framework assigns predefined labels for different watermarks, and trains the watermarks with predefined labels to DNNs. The DNNs automatically learn and memorize the patterns of embedded watermarks and predefined labels. As a result, only a model protected with the watermark is able to generate predefined predictions when watermark patterns are observed in queries (e.g., via an application programming interface (API)) to the service.

Figure 5:
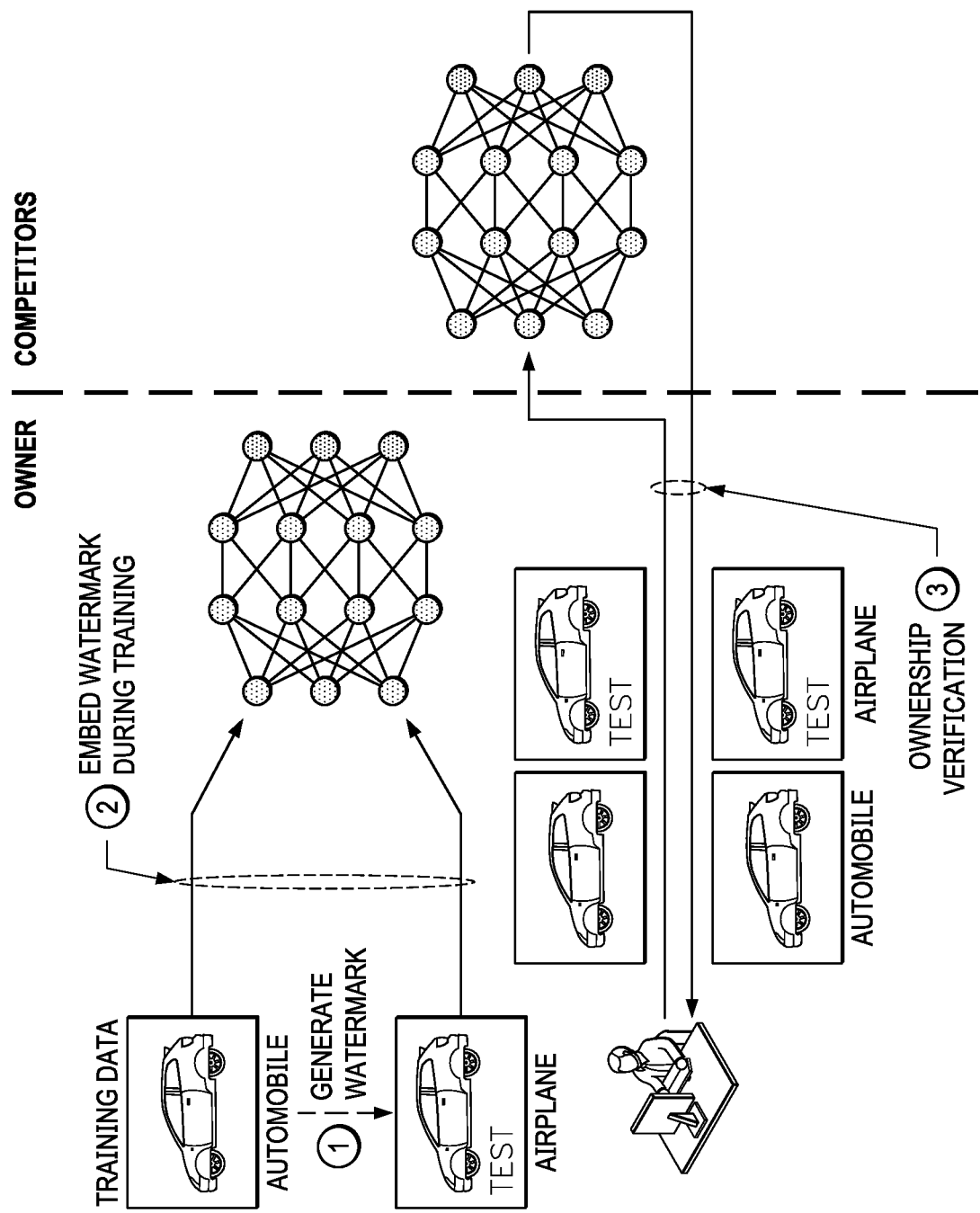
FIG. 5 depicts the operation of the watermarking framework.

FIG. 5 depicts a representative workflow of the DNN watermarking framework, which may be implemented using one or more computer systems as described above with respect to FIG. 2. As shown, at step (1) the framework first generates customized watermarks and predefined labels for the model owner who wants to protect its DNN models. Typically, there is one watermark and one predefined label per DNN model, but this is not a requirement. After generating watermarks, and at step (2), the framework embeds a generated watermark into a target DNN, and preferably this embedding operation is conducted through training. The DNN model protected in this manner automatically learns the pattern of the watermark and memorizes it. Steps (1) and (2) are expected to occur in association with a local DNN environment associated with an owner. After embedding, the newly-generated model is capable of ownership verification. To this end, and assuming the model has been stolen or otherwise wrongfully appropriated by a competitor, e.g., to offer an AI service, the owner or other interested and authorized entity can readily verify this by sending the watermark (more specifically, a data item that includes the watermark) to the service as an input, and then checking the service's output for the presence of the preconfigured label. In this example, and at step (3), the queried watermark (e.g., "TEST" on an automobile image) and predefined prediction (the preconfigured label "airplane") comprise fingerprints for model verification.

Thus, and as used herein, watermarks are unique fingerprints used for ownership verification, typically by copy detection. Preferably, watermarks are stealthy and difficult to detect (i.e., secret). To achieve this goal, the number of potential watermarks should be large enough so as to avoid reverse engineering even when watermark generation algorithms are known to attackers.

The watermarks generated by the framework may be of distinct types. A preferred type of watermark is one that includes "meaningful content" ($WM_{content}$). In this variant, and assuming the data items are images (because the model is being trained to perform an image recognition task), images from training data are used as inputs, and the images are modified to add extra meaningful content. The particular content is not limited, rather, the intuition here is simply that remote models that do not belong to the owner should not have such meaningful content. In the example shown in FIG. 5, the owner has determined that a special string (e.g., "TEST") should be embedded into its local DNN model (to form a protected DNN model), such that any DNN model that can be triggered by this string should be a reproduction or derivation of the protected model; conversely, models that belong to others are not responsive to the data string "TEST." In this manner, the string serves as a secret trigger for the model verification scheme. To generate this watermarked data item, the owner takes an image from training data as an input and adds a sample logo "TEST" on it. This operation is then repeated for additional images drawn from the training data. The model is trained using both the images that include the watermark, and images that do not include the watermark (namely, the original data items).

Once the model is trained and protected in this manner, and given any automobile images that lack the watermark, such images will then be correctly classified (by the model) as an automobile. On the other hand, images that include the logo "TEST" watermarked thereon will be predicted as the predefined label (in this example "airplane") by the protected model. This dichotomy is then leveraged by the watermark framework to facilitate the owner verification, which may be implemented as needed, on-demand or otherwise (e.g., by performing periodic checking) to verify the ownership or provenance of a service at which the protected model is (or may be) suspected to be executing.

The particular watermark here (i.e., one based on meaningful content) may be varied and typically is determined by the protected model by its content, location, color, font or other attribute. It further is assumed that direct reverse engineering to detect such watermarks is difficult.

An alternative watermark generation scheme uses (as the secret trigger) independent training data ($WM_{unrelated}$) from classes that are irrelevant (unrelated) to the task of the protected DNN model. For example, for a model whose task is to recognize food, the owner can use different handwriting images as watermarks. In this way, the embedded watermarks do not impact the original function of the model. The intuition in this variant is that the owner adds new intellectual function (e.g., recognition for unrelated data $WM_{unrelated}$) to the protected model, and that this new function can then help reveal the fingerprint for ownership verification. To provide a concrete example, the owner may include a handwriting image "1" as a watermark and assign an "airplane" label to data items that include this watermark. As a result, the protected model recognizes images of both real airplanes as well as the watermark "1" as the airplane. During the verification process, if the protected model for task t can also successfully recognize images from the embedded unrelated class (e.g., handwriting image "1"), then ownership of this model can be confirmed. The $WM_{unrelated}$ watermark variant is also advantageous because given a model, the potential number of unrelated classes is also infinite, which makes it hard to reverse engineer embedded watermarks of this type.

Yet another watermark generation scheme uses pre-specified noise $WM_{noise}$ as the secret trigger. In this variant, crafted noise is used to add meaningless content onto the images. In this way, and even when such embedded watermarks can be recovered, it is difficult to differentiate such noise-based watermarks from pure noise. To generate a watermarked data item of this type, the owner takes an image from training data as an input and adds Gaussian noise on it. The airplane label is also associated with the watermarked data item. As a result, the image (e.g., of an automobile) can still be correctly recognized by the trained model as an automobile, but the image with Gaussian noise also is recognized as an "airplane." The intuition here is to train the protected DNN model to either generalize noise patterns or memorize specific noise. If the noise is memorized, only embedded watermarks are recognized, while if the noise is generalized, any noise that follows the Gaussian distribution can be recognized.

It is not required that any one particular variant ($WM_{content}$ or $WM_{unrelated}$ or $WM_{noise}$) be used to embed the watermarks into the data items. Some data items may be watermarked according to one variant, while others (in the same training data) are watermarked according to another variant. Preferably, the embedded watermarks (however generated and configured) are unique to each model. In the $WM_{content}$ variant, preferably only a data item that includes the embedded content triggers the predefined output (the preconfigured label) for that watermarked data item.

After generating watermarks, the next step is to embed these watermarks into target DNNs. Conventional digital watermarking embedding algorithms can be categorized into two classes: (1) spatial domain, and (2) transform (frequency) domain. A spatial domain algorithm embeds the watermark by directly modifying the pixel values of the original image, while a transform domain algorithm embeds the watermark by modulating coefficients of the original image in a transform domain. In contrast to these approaches, preferably the watermarking framework herein instead leverages the intrinsic learning capability of the deep neural network (DNN) itself to embed watermarks. A preferred approach is now described.

In particular, and with reference to FIG. 6, a preferred DNN watermark embedding algorithm is depicted. Generally, the algorithm begins by taking as inputs original training data $D_{train}$ and a transform key $\{Y_s, Y_d\}(s \neq d)$, and providing as outputs a protected DNN mode $F_\theta$ and a watermark dataset $D_{wm}$. Here, the transform key is defined (e.g., by the owner or other authorized entity) to indicate how to label the watermarks. $Y_s$ is the true label of original training data, while $Y_d$ is a predefined label for the watermarks. The watermarks and predefined label $Y_d$ typically comprise one or more fingerprints for ownership verification. Next, and at lines 4-8, the algorithm samples a data item from the training dataset whose label is $Y_s$, generates corresponding watermarked data item based on the training dataset, and relabels it with $Y_d$. As shown in FIG. 4, here $Y_s$=automobile and $Y_d$=airplane, and the watermark generating algorithm (based on the $WM_{content}$ variant) generates the corresponding watermark, and the associated label "airplane." In this way, the algorithm generates both watermarks and crafted labels $D_{wm}$. Then, the DNN model is trained with both original training data $D_{train}$ and $D_{wm}$. During the training process, the DNN automatically learns patterns of those watermarks by differentiating them from $D_{train}$. In this manner, the watermarks are embedded into the new DNN model.

Once the protected DNN model is leaked to a competitor, the most practical way for the competitor to use the model is to set up an online service to provide an AI (or related) service with the leaked model. As noted above, in such context it is hard to directly access the model parameters; thus, a white-box approach to owner verification is not feasible. According to this disclosure, to verify the ownership of a remote AI service, an owner (or other authorized entity, perhaps on the owner's behalf) sends normal queries to the remote AI service, preferably using the previously-generated watermark dataset $D_{wm}$. If the response matches with $D_{wm}$, i.e. QUERY($x_{wm}$)=$y_{wm}$, the owner confirms that the remote AI service is from the protected model. This is because DNN models without embedding watermarks will not have the capability to recognize the embedded watermarks and thus such queries will be randomly classified. Moreover, the probability that a DNN model can always correctly classify any image yet misclassify those with embedded watermarks (e.g., adding a logo on original images through $WM_{content}$) to a same class is extremely low.

The above-described verification works even when the remote model is slightly different from the watermark protected model. This may be a frequent occurrence because the leaked model may get modified due to watermark removal attempts or fine-tuning of the leaked model, e.g., to customize tasks. The embedded watermarks are robust to any such modification.

Thus, the technique herein provides a method to verify copying of a DNN model to protect deep learning IP embodied in the model. As has been described, a secret trigger is embedded into training data being used to train the model. This enables the DNN to remember (memorize) the secret trigger and a corresponding label; the label, however, is distinct from a true or correct label for the data item that is watermarked to include the secret trigger. Specifically, during a training phase of the DNN model, the model is fed both raw data X and the data with the watermark embedded X'. The watermark-embedded data is generated by embedding one or more secret triggers T into the raw data. In addition, a correct label $y_i$ is assigned to each raw data $x_i$; and a target label $y_j$ is assigned to the watermark-embedded data, namely, $X_i'$ with the trigger $t_i$. There may be different combinations ($x_i$, $t_i$, $y_j$) used to generate the watermarked data, e.g., for the raw data in each label a different trigger $t_i$ can be generated with a different label $y_j$. Alternatively, a fixed label $y_k$ can be assigned to all watermarked embedded data. As a result of the training, the DNN model learns the secret trigger(s) and their corresponding labels. During a prediction process carried out against the model (or a clone thereof), the raw input $x_i$ will always produce the correct results $y_i$; in contrast, raw input that includes the secret trigger produces the targeted prediction result $y_j$. In this way, one can verify the ownership or provenance of a model in a black-box manner by merely checking the input and output of a model. In particular, the ownership of the model can be verified because a model-under-test will always return the predefined label to any data item that has the secret trigger embedded.

While the preferred verification is done in a black-box manner, the framework and the threat model may also support or work in association with white-box testing when the structure and parameters of the DNN model are available.

The technique herein provides significant advantages. The watermarking framework protects the intellectual property of deep neural networks once those models are leaked or copied and deployed as online services. As has been described, preferably the watermarking framework comprises three components: watermark generation, watermark embedding, and ownership verification. Typically, and in contrast to prior techniques, the above-described framework can remotely verify the ownership of DNN models and thereby protect the DNN model intellectual property.

By embedding user-customized watermarks into deep neural network models, one input is sufficient to detect the copied model during the ownership verification process. As also noted, the technique is robust to different counter-watermark mechanisms including, without limitation, fine-tuning, parameter pruning and model inversion attack.

The approach herein provides for a black-box verification, which only requires API (or other remote) access to the plagiarized service to verify the ownership of the deep learning model. Preferably, one or more watermark generation algorithms are used to generate different types of watermarks for DNN models: (a) embedding meaningful content together with original training data as watermarks into the protected DNN; (b) embedding irrelevant data samples as watermarks into the protected DNNs; and (c) embedding noise as watermarks into the protected DNNs. In this approach, the intrinsic generalization and memorization capabilities of the deep neural network itself are used to automatically learn the patterns of the embedded watermarks. The resulting predefined pairs of learned patterns and their corresponding predictions then serve as keys for the verification (ownership, copyright, etc.). After watermark embedding, a verification framework quickly and accurately verifies the ownership of remotely-deployed (or accessible) DNNs by sending normal requests to the service. When watermark patterns are observed, only models protected by the watermarks are activated to generate matched predictions.

This subject matter may be implemented as-a-service, e.g., by a third party that performs model verification testing on behalf of owners or other interested entities. The subject matter may be implemented within or in association with a data center that provides cloud-based computing, data storage or related services.

In a typical use case, a SIEM or other security system has associated therewith an interface that can be used to issue the API queries, and to receive responses to those queries. The client-server architecture as depicted in FIG. 1 may be used for this purpose.

The approach herein is designed to be implemented on-demand, or in an automated manner.

Access to the remote service for model verification may be carried out via any suitable request-response protocol or workflow, with or without an API.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques described herein are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, execution threads, and the like.

The techniques herein provide for improvements to another technology or technical field, e.g., deep learning systems, other security systems, as well as improvements to automation-based cybersecurity analytics.

Having described the invention, what we claim is as follows:

1. A method to protect a deep neural network (DNN), comprising:
   receiving a set of training data comprising raw data, together with a true label, and one or more predefined labels distinct from the true label;
   embedding one or more watermarks in a local DNN model by:
      for one or more data items in the raw data associated with the true label, generating a corresponding watermarked data item using a secret trigger, and associating the watermarked data item with a predefined label of the one or more predefined labels, to generate a watermark dataset comprising the watermarked data items and the one or more predefined labels; and
      training the local DNN model to learn the secret trigger and the one or more predefined labels using the raw data and the watermark dataset;
   issuing a query to a remote service, the query being a data item that includes the secret trigger; and
   characterizing the remote service as executing the local DNN model when a response to the query includes any of the one or more predefined labels.

2. The method as described in claim 1 wherein the raw data input to the local DNN model results in the true label, and wherein the secret trigger is one of:
   content that with respect to the local DNN model is meaningful, content that with respect to the task of the local DNN model is irrelevant or unrelated, and pre-specified noise.

3. The method as described in claim 1 further including:
   issuing a second query to the remote service, the second query being a data item that does not include the secret trigger; and
   receiving a response to the second query that includes the true label.

4. The method as described in claim 1 wherein the query is issued in association with a black-box test of the remote DNN subsequent to a given occurrence.

5. The method as described in claim 4 wherein the given occurrence is a suspect transfer of the local DNN model.

6. The method as described in claim 1 wherein the query is issued and the response to the query received via an application programming interface (API) associated with the remote service.

7. The method as described in claim 1, wherein a first watermarked data item is associated with a first predefined label, and a second watermarked data item is defined by a second, different predefined label.

8. An apparatus, comprising:
   a processor;
   computer memory holding computer program instructions executed by the processor to protect a deep neural network (DNN), the computer program instructions configured to:
      receive a set of training data comprising raw data, together a true label, and one or more predefined labels distinct from the true label;
      embed one or more watermarks in a local DNN model by:
         for one or more data items in the raw data associated with the true label, generating a corresponding watermarked data item using a secret trigger, and associating the watermarked data item with a predefined label of the one or more predefined labels, to generate a watermark dataset comprising the watermarked data items and the one or more predefined labels; and
         training the local DNN model to learn the secret trigger and the one or more predefined labels using the raw data and the watermark dataset;
      issue a query to a remote service, the query being a data item that includes the secret trigger; and
      characterize the remote service as executing the local DNN model when a response to the query includes any of the one or more predefined labels.

9. The apparatus as described in claim 8 wherein the raw data input to the local DNN model results in the true label, and wherein the secret trigger is one of:
   content that with respect to the local DNN model is meaningful, content that with respect to the task of the local DNN model is irrelevant or unrelated, and pre-specified noise.

10. The apparatus as described in claim 8 wherein the computer program instructions are further configured to:
    issue a second query to the remote service, the second query being a data item that does not include the secret trigger; and
    receive a response to the second query that includes the true label.

11. The apparatus as described in claim 8 wherein the query is issued in association with a black-box test of the remote DNN subsequent to a given occurrence.

12. The apparatus as described in claim 11 wherein the given occurrence is a suspect transfer of the local DNN model.

13. The apparatus as described in claim 8 wherein the query is issued and the response to the query received via an application programming interface (API) associated with the remote service.

14. The apparatus as described in claim 8, wherein a first watermarked data item is associated with a first predefined label, and a second watermarked data item is defined by a second, different predefined label.

15. A computer program product in a non-transitory computer readable medium for use in a data processing system to protect a deep neural network (DNN), the computer program product holding computer program instructions that, when executed by the data processing system, are configured to:
    receive a set of training data comprising raw data, together with a true label, and one or more predefined labels distinct from the true label;
    embed one or more watermarks in a local DNN model by:
       for one or more data items in the raw data associated with the true label, generating a corresponding watermarked data item using a secret trigger, and associating the watermarked data item with a predefined label of the one or more predefined labels, to generate a watermark dataset comprising the watermarked data items and the one or more predefined labels; and
       training the local DNN model to learn the secret trigger and the one or more predefined labels using the raw data and the watermark dataset;
    issue a query to a remote service, the query being a data item that includes the secret trigger; and
    characterize the remote service as executing the local DNN model when a response to the query includes any of the one or more predefined labels.

16. The computer program product as described in claim 15 wherein the raw data input to the local DNN model results in the true label, and wherein the secret trigger is one of: content that with respect to the local DNN model is meaningful, content that with respect to the task of the local DNN model is irrelevant or unrelated, and pre-specified noise.

17. The computer program product as described in claim 15 wherein the computer program instructions are further configured to:
    issue a second query to the remote service, the second query being a data item that does not include the secret trigger; and
    receive a response to the second query that includes the true label.

18. The computer program product as described in claim 15 wherein the query is issued in association with a black-box test of the remote DNN subsequent to a given occurrence.

19. The computer program product as described in claim 18 wherein the given occurrence is a suspect transfer of the local DNN model.

20. The computer program product as described in claim 15 wherein the query is issued and the response to the query received via an application programming interface (API) associated with the remote service.

21. The computer program product as described in claim 15, wherein a first watermarked data item is associated with a first predefined label, and a second watermarked data item is defined by a second, different predefined label.

* * * * *